A. SPARING.
SAWING ATTACHMENT.
APPLICATION FILED NOV. 13, 1918.

1,323,923.

Patented Dec. 2, 1919.
2 SHEETS—SHEET 1.

Witnesses
Everett Lloyd Jr.

Inventor
August Sparing
By Victor J. Evans
Attorney

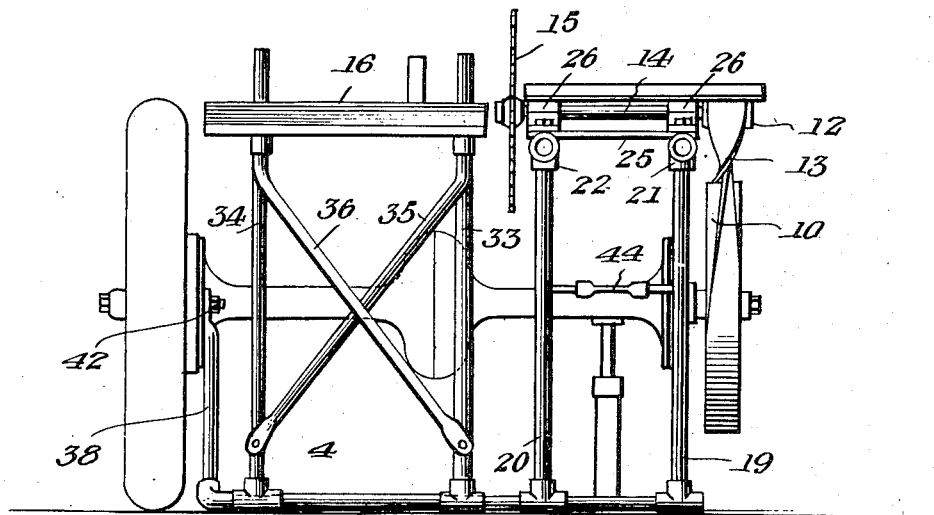
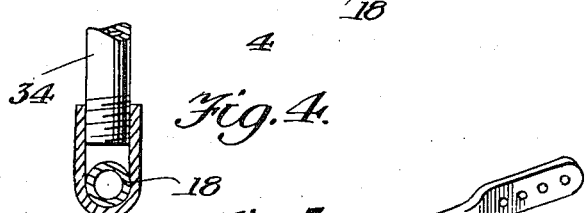
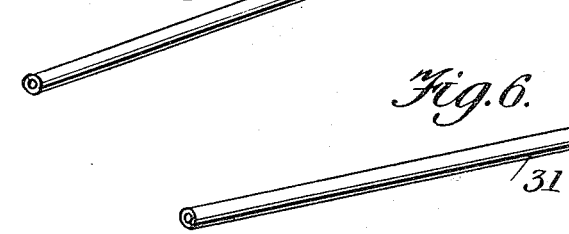
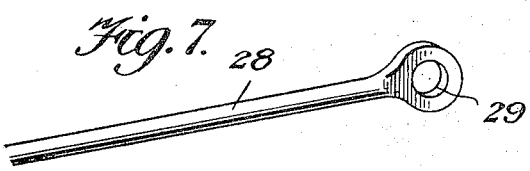

UNITED STATES PATENT OFFICE.

AUGUST SPARING, OF HELENA, MONTANA.

SAWING ATTACHMENT.

1,323,923.   Specification of Letters Patent.   Patented Dec. 2, 1919.

Application filed November 13, 1918.  Serial No. 262,314.

*To all whom it may concern:*

Be it known that I, AUGUST SPARING, a citizen of the United States, residing at Helena, in the county of Lewis and Clark and State of Montana, have invented new and useful Improvements in Sawing Attachments, of which the following is a specification.

The object of this invention is to provide means for mounting a saw in order that it may be driven from a pulley mounted on the rear axle of an automobile, the mounting means being directly connected with the axle and including a lower transverse member carrying devices for directly mounting the saw and mounting the work table, said lower transverse member resting upon the ground and serving to permit of the shifting of the entire apparatus, when desired, by permitting the wheel carried by the end of the axle opposite to that carrying the pulley to come into contact with the surface of the ground, the engine being started and the machine being driven either forwardly or backwardly.

With the foregoing and other objects in view, the invention consists in the novel construction, combination and arrangement of elements hereinafter described and claimed.

In the drawings,

Fig. 3 is an end elevation,

Figs. 4 to 7 illustrate details of construction described below.

Figure 1:
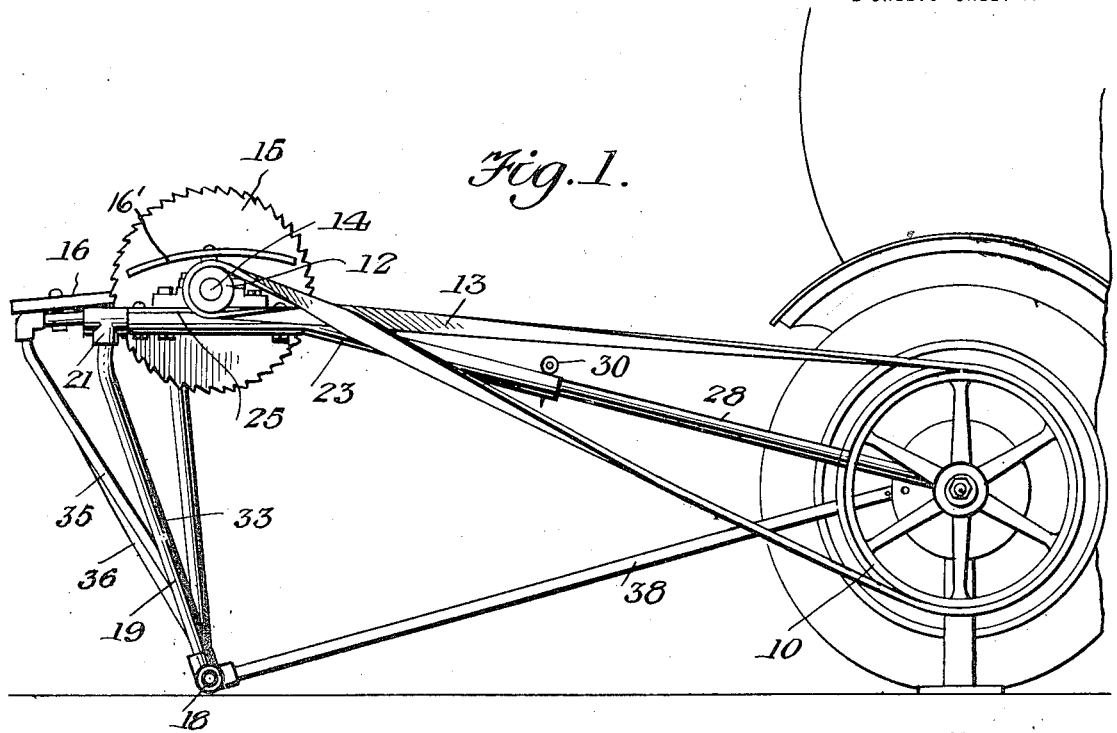
Figure 1 is a view of the device in side elevation.
Figure 2:
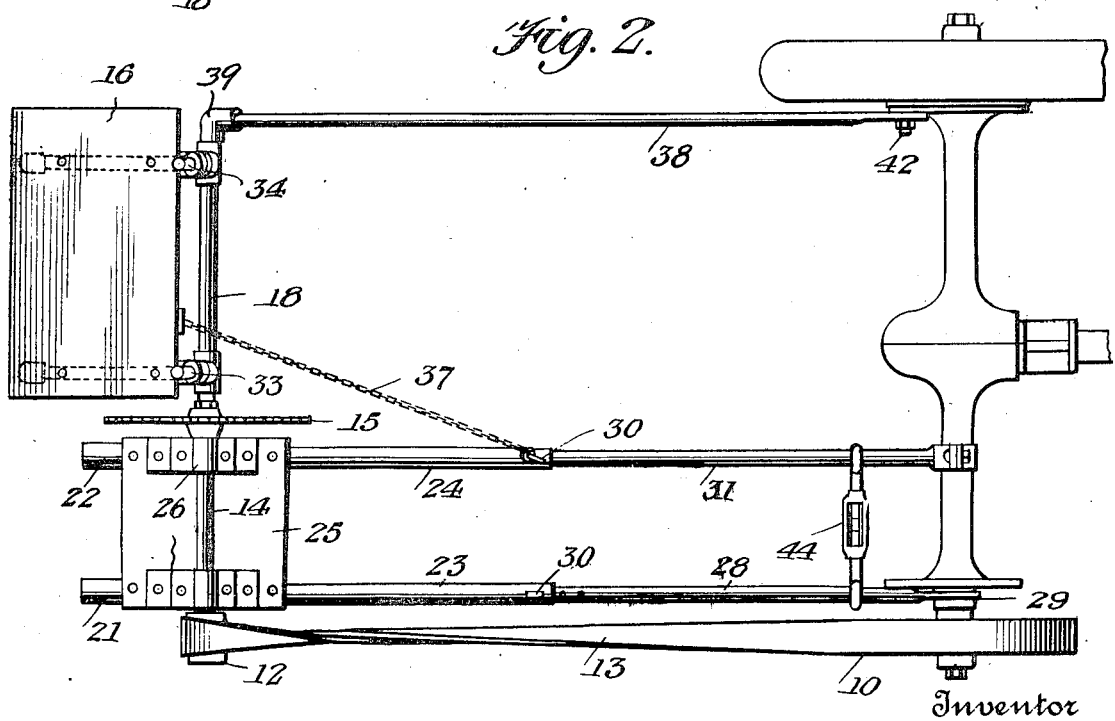
Fig. 2 is a top plan view, the guard member over the saw shaft being omitted.

In carrying out my invention I employ a motor car of any desired type, the apparatus here described being especially adapted for use in connection with a Ford car, and after removing one of the wheels, mount a pulley 10 on the driven member of the axle, this pulley driving a pulley 12 by means of a belt 13. This pulley last named is carried by one end of the shaft 14 on which the saw 15 is mounted. The work table is designated 16 and is mounted in the manner described below. A guard plate 16' may be mounted as shown in Fig. 1.

A lower transverse element of the frame is designated 18 and connected therewith are a plurality of uprights 19 and 20, supporting T couplings 21 and 22 having connection with pipe sections 23 and 24 forming elements of longitudinal connecting devices. On these T couplings I mount a transverse plate 25, supporting bearings 26 for the saw shaft.

A rod 28 has an eye 29 in one end thereof, this eye being passed loosely over the projecting end of one of the driven members of the axle, the rod passing into one of the pipe sections above referred to and being secured in any adjusted position by means of a removable pin 30. A second rod 31 has a hinged clamping jaw at one end mounted on a stationary jaw, the clamp thus formed encircling the axle of the car or the tubular casing thereof. This rod 31 extends into the other of said pipe sections forming a longitudinal connecting element of the frame. Adjustment is secured by means of a pin 30 similar to that already mentioned.

The work table 16 is swingingly mounted with reference to the lower transverse element 18 of the frame and is supported by means of uprights 33 and 34 carrying brackets 35 and 36 serving to directly mount the table. The inclination of the table can be varied in view of the swinging mounting means referred to. A chain 37 may be connected with one of the brackets or with any portion of the table and extend to any suitable stationary element, such as one of the pins 30, the chain holding the table in an adjusted position.

The adjustment between the elements of the longitudinal connecting rods permits of the tightening of the belt to the required degree and I also provide an adjustment and support comprising an inclined bar or brace designated 38 and having connection by means of elbow 39 with the lower transverse element 18 of the frame. One end of this brace 38 is provided with a series of apertures, any one of which may be used when the brace is fastened to an element of the brake, such as the bolt 42. A turn buckle 44, with suitable connecting elements, serves to retain the rods 28 and 31 in the required parallel relation.

In the use of this device, only a very short time is required for detaching one of the wheels of the car and mounting the pulley thereon, connecting the belt with the pulley on the saw shaft, and effecting the required connection and adjustment of the elements of the frame. If it is desired to shift the position of the apparatus, it is only necessary to move the jack from beneath the axle of the car and allow the wheel which has not been removed to contact with the surface of the ground, after which the frame may be shifted forwardly or backwardly by driving the car in the required direction.

What is claimed is:

An attachment for a motor vehicle, constituting a saw frame, and comprising a transverse element adapted to rest upon the ground, uprights connected with said transverse element, near one end thereof, a pair of rods extending from the uprights for connection with the rear axle of the vehicle, the free end of one of the rods being adapted to slip over an end of the axle when that running wheel has been removed, and means for clamping the end of the other rod to the axle-case, said rods supporting a saw shaft, other uprights pivotally connected with the transverse element and supporting a work table, and a rod connecting the other end of the transverse element with said rear axle.

In testimony whereof I affix my signature in presence of two witnesses.

AUGUST SPARING.

Witnesses:
 JOHN G. BROWN,
 WM. S. WALKER.